United States Patent [19]

Madden

[11] Patent Number: 4,690,329

[45] Date of Patent: Sep. 1, 1987

[54] EXHAUST NOZZLE COUPLED WITH REVERSER EXHAUST DOOR

[75] Inventor: William M. Madden, Palm Springs, Fla.

[73] Assignee: United Technologies Corporation, Hartford, Conn.

[21] Appl. No.: 667,707

[22] Filed: Nov. 2, 1984

[51] Int. Cl.$^4$ ............................................. B63H 11/10
[52] U.S. Cl. .............................. 239/265.19; 60/226.2; 60/230
[58] Field of Search ...................... 239/265.19, 265.25, 239/265.27, 265.29, 265.33, 265.35, 265.39, 265.41; 60/226.2, 228, 229, 230

[56] References Cited

U.S. PATENT DOCUMENTS

| | | | |
|---|---|---|---|
| 2,620,622 | 12/1952 | Lundberg | 244/110 B X |
| 3,134,226 | 5/1964 | Gardiner et al. | 60/229 X |
| 3,587,973 | 6/1971 | Wolf | 239/265.19 X |
| 3,608,314 | 8/1969 | Colley | 60/226.2 |
| 3,614,037 | 10/1971 | Vdolek | 239/265.19 X |
| 3,665,150 | 4/1972 | Haberkom et al. | 239/265.35 X |
| 3,667,680 | 6/1972 | Weed | 239/265.39 X |
| 3,703,258 | 11/1972 | Weldner | 239/265.39 X |
| 3,863,867 | 2/1975 | Sonulin et al. | 60/226.2 X |
| 3,915,415 | 10/1975 | Pazmany | 60/226.2 X |
| 4,241,876 | 12/1980 | Pedersen | 60/229 X |
| 4,375,276 | 3/1983 | Konarski | 239/265.29 |

FOREIGN PATENT DOCUMENTS

943820  10/1952  France ............................ 239/265.25

*Primary Examiner*—Donald P. Walsh
*Attorney, Agent, or Firm*—Stephen E. Revis

[57] ABSTRACT

A convergent/divergent gas turbine engine exhaust nozzle having reverse thrust capability includes a door which blocks a reverse flow outlet port when the nozzle convergent flap is in any forward thrust operating mode. The door is coupled to the convergent nozzle flap such that it opens as the convergent nozzle flap moves to a reverse thrust position and the flap directs the exhaust gases through the reverser outlet.

4 Claims, 8 Drawing Figures

EXHAUST NOZZLE COUPLED WITH REVERSER EXHAUST DOOR

CROSS REFERENCE TO RELATED PATENT APPLICATION

The subject matter of this application is related to the subject matter of commonly owned U.S. patent application Ser. No. (667,709) titled "Exhaust Nozzle With Improved Reverser Exhaust Door Mechanism" by Thomas A. Roach and Roy R. Starke, and U.S. patent application Ser. No. 667,708 titled "Two Dimensional Gas Turbine Engine Exhaust Nozzle" by Edward B. Thayer and George H. McLafferty, both filed on even day herewith.

1. Technical Field

This invention relates to gas turbine engine exhaust nozzles.

2. Background Art

Two dimensional variable area exhaust nozzles for gas turbine engines are well known in the art. One such exhaust nozzle is described in U.S. Pat. No. 4,310,121. Often such two dimensional nozzles include thrust reversing capability as well as a variable nozzle exit area. Examples of such nozzles are shown in U.S. Pat. Nos. 4,013,226; 4,052,007; and 4,375,276. In recent years reduced nozzle weight, nozzle simplicity, and nozzle compactness have become of greater concern. Improvements are continually sought in all of these areas.

DISCLOSURE OF INVENTION

One object of the present invention is an improved, lightweight two-dimensional variable area gas turbine engine exhaust nozzle having thrust reversing capability.

According to the present invention, a two-dimensional exhaust nozzle includes opposed, spaced apart, rotatable converging flaps each being operably connected, through an actuation mechanism, to respective doors which block respective reverse thrust outlets, said doors being rotatable about the same axis as their respective flaps, the forward edge of each flap being in sealing relationship with its respective door throughtout flap rotation, wherein the actuation mechanism rotates the flaps through forward thrust positions without moving the blocker doors, and moves the blocker doors to open the reverse thrust outlets as the flaps rotate to a reverse thrust position, in which position the flaps block the rearward flow of gases through the engine and redirect the gases through the open reverse thrust outlets.

In one embodiment the actuation mechanism includes a separate cam track fixed to each flap and rotatable therewith. Each thrust reverser outlet door is connected to the flap through a linkage which is operably connected to a cam follower which rides in the cam track. The cam track is shaped such that the linkage remains stationary as the flap rotates through forward thrust positions. As the flap moves from its minimum area forward thrust position to a full reverse thrust position the cam track moves the linkage to rotate the reverser outlet door to its open position. The forward edge of each flap sealingly engages the door throughout the full range of movement of the flap and the door to prevent exhaust gases from exiting between the door and the flap.

The foregoing and other objects, features and advantages of the present invention will become more apparent in the light of the following detailed description of preferred embodiments thereof as shown in the accompanying drawings.

BEST MODE FOR CARRYING OUT THE INVENTION

Figure 1:
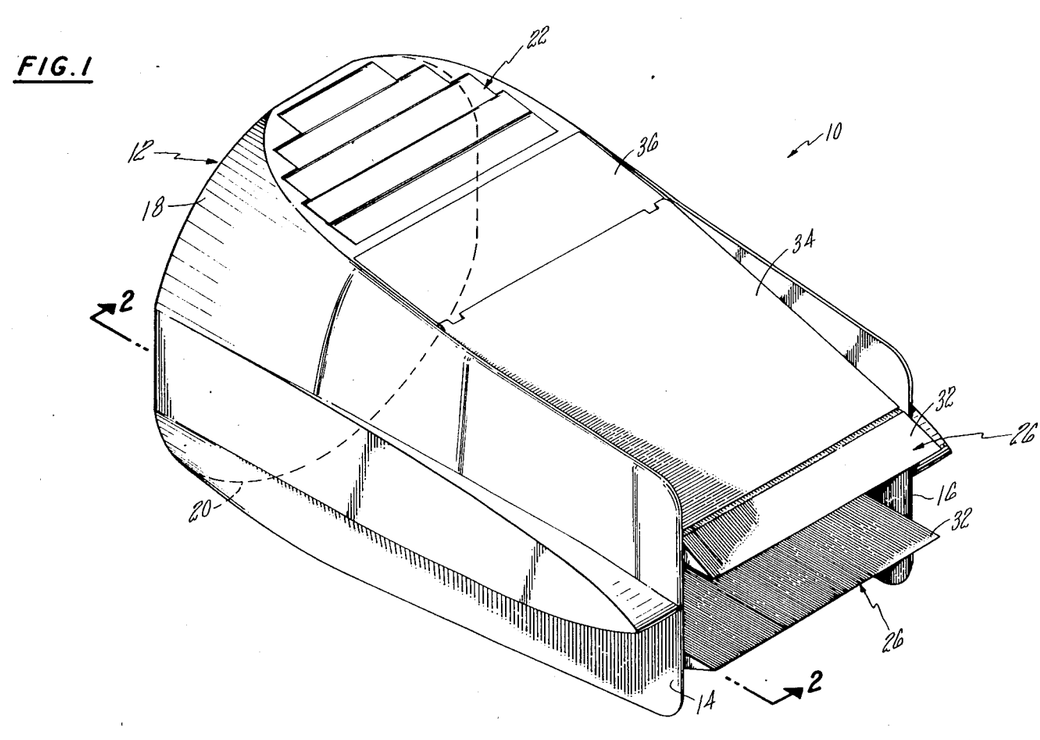
FIG. 1 is a perspective view of an exhaust nozzle incorporating the present invention.
Figure 2:
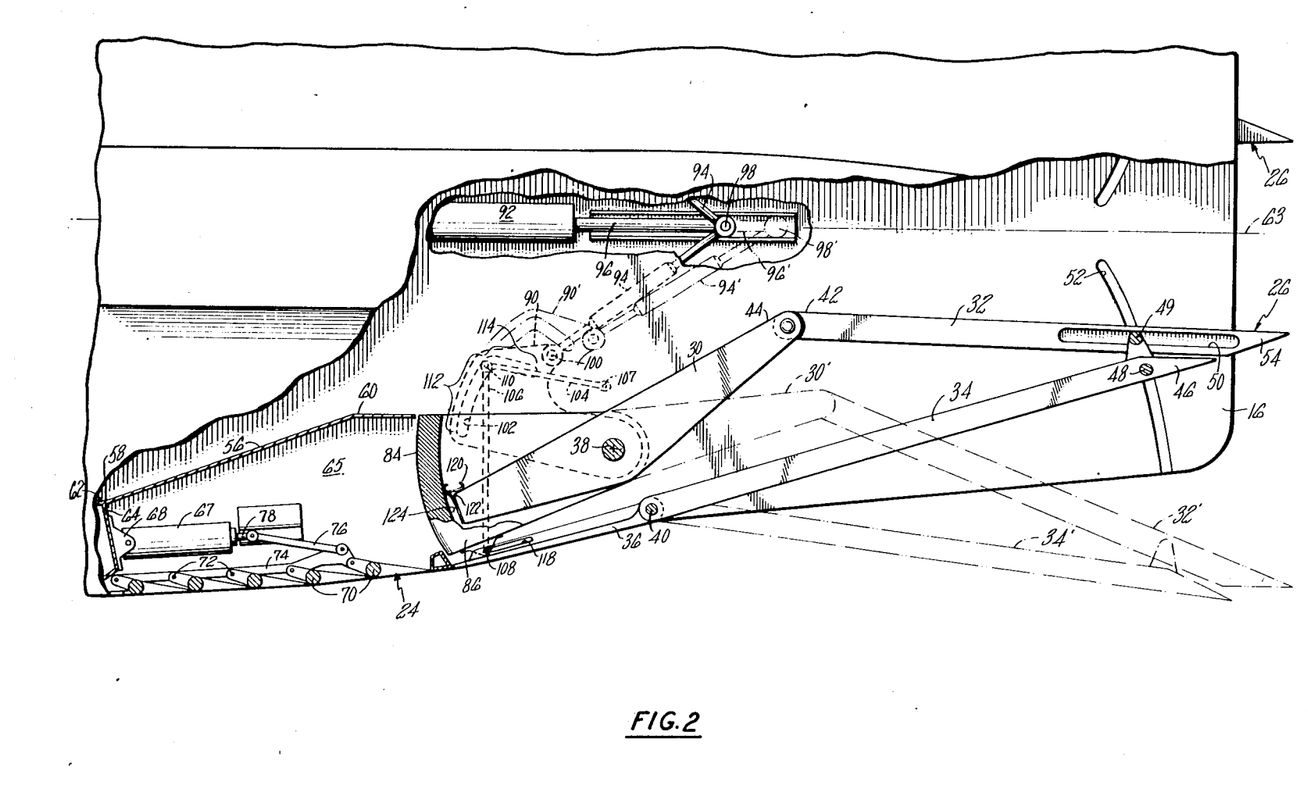
FIG. 2 is a view, partly broken away, taken generally in the direction 2—2 of FIG. 1, showing the exhaust nozzle of the present invention in a minimum throat area position.
Figure 3:
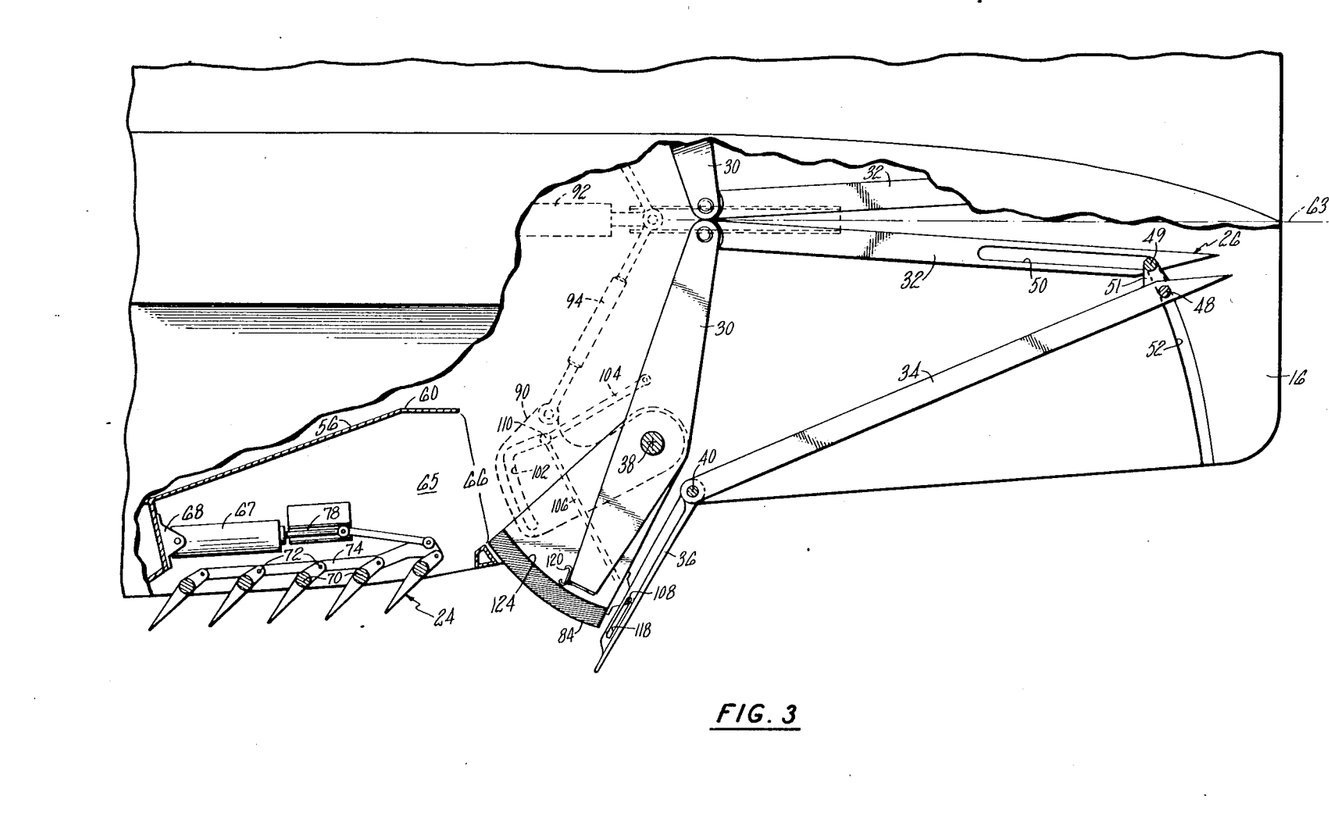
FIG. 3 is a view similar to that of FIG. 2, but showing the exhaust nozzle in its reverse thrust position.

As an exemplary embodiment of the present invention consider the exhaust nozzle assembly 10 shown in the perspective view of FIG. 1 and the cross sectional views of FIGS. 2 and 3. The assembly 10 comprises an external exhaust duct generally represented by the reference numeral 12. The exhaust duct 12 includes a pair of spaced apart sidewalls 14, 16 which fair into an upstream transition duct 18. The duct 18 has a substantially circular inlet 20, shown in broken lines, and includes upper and lower sets of louvers 22, 24 which are shown closed in FIGS. 1 and 2 and open in FIG. 3. The louvers 22, 24 are closed during forward thrust operation so as to present a smooth external fairing, and they are open during reverse thrust operation of the nozzle, as will be more fully explained hereinbelow.

The nozzle assembly 10 further includes upper and lower flap assemblies 26, each comprising a convergent flap 30, a divergent flap 32, a downstream external fairing flap 34 and an associated upstream external fairing flap 36. The flaps 30, 32, 34 and 36 each extend from the sidewall 14 to the sidewall 16. Each convergent flap 30 is pivotally secured to the sidewalls 14, 16 and rotates about its own stationary axis 38. Each set of associated upstream and downstream external fairing flaps 36, 34, respectively, are also pivotally connected to the sidewalls 14, 16 and rotate about a common axis 40 which is parallel to the axis 38. Each divergent flap 32 is pivotally connected at its forward edge 42 to the rearward edge 44 of the convergent flap 30 of its respective assembly 26.

The rearward portion 46 of each downstream external fairing flap 34 includes two pins 48 and 49 extending outwardly from each side thereof and fixed thereto. The pins 49 pass through slots 50 in each side of the divergent flap 32, and pins 48 extend into sliding engagement with guide tracks 52 in each of the sidewalls 14, 16. The tracks 52 have a circular curvature having as their centers the axis of rotation of the fairing flap 34., The position of the forward edge 42 of each divergent flap 32 is controlled by the position of the convergent flap 30 to which it is attached. The actuation system for the flaps 30 is to be described in detail hereinbelow. The position of the rearward edges 54 of the divergent flaps 32 are controlled by separate actuation systems which are not shown or further described herein since the convergent flaps 32, the external fairing flaps 34, and the manner in which they move are not considered to be a part of the present invention. It is sufficient to say that each divergent flap 32 of the upper and lower flap assemblies 26 are actuated independently, although in unison, to achieve variations in nozzle exit area as well as thrust vectoring.

The exhaust nozzle assembly 10 includes an engine gas path transition duct 56 which is substantially circular at its forward end 58 and rectangular at its rearward end 60. The forward end 58 mates with a circular gas path duct 62 which defines the outlet of the gas flow-path of the gas turbine engine (not shown) upstream of the exhaust nozzle assembly 10. The engine centerline is designated by the reference numeral 63. Forward support walls 64 extends substantially radially outwardly from the forward end 58 of the duct 56 and are secured to the external transition duct 18. The louvers 22, 24, in combination with the external and internal transition ducts 18, 56 respectively, and forward walls 64, define an outlet chamber 65. The chamber 65 has a substantially rectangular rearwardly facing openings 66 extending between the sidewalls 14, 16, which openings are the nozzle exhaust gas outlets during reverse thrust operation. Actuators 67 (upper and lower) are pivotally mounted to brackets 68 attached to the forward wall 64 for opening and closing the louvers 22, 24. For example, with respect to the lower set of louvers, in this embodiment each of the louvers is pivotally secured about its own axis 70 to the transition duct 18. Each individual louver of the set is also pivotally attahced at pivot points 72 to a common moveable link 74. A connecting rod 76 is attached at one of its ends to the link 74 and at its other end to the push rod 78 of the actuator 67. Controlled movement of the push rod 78 opens and closes the louvers to any desired extent to vary the direction of flow of exhaust gases therethrough during reverse thrust operation of the exhaust nozzle assembly.

Figure 4:
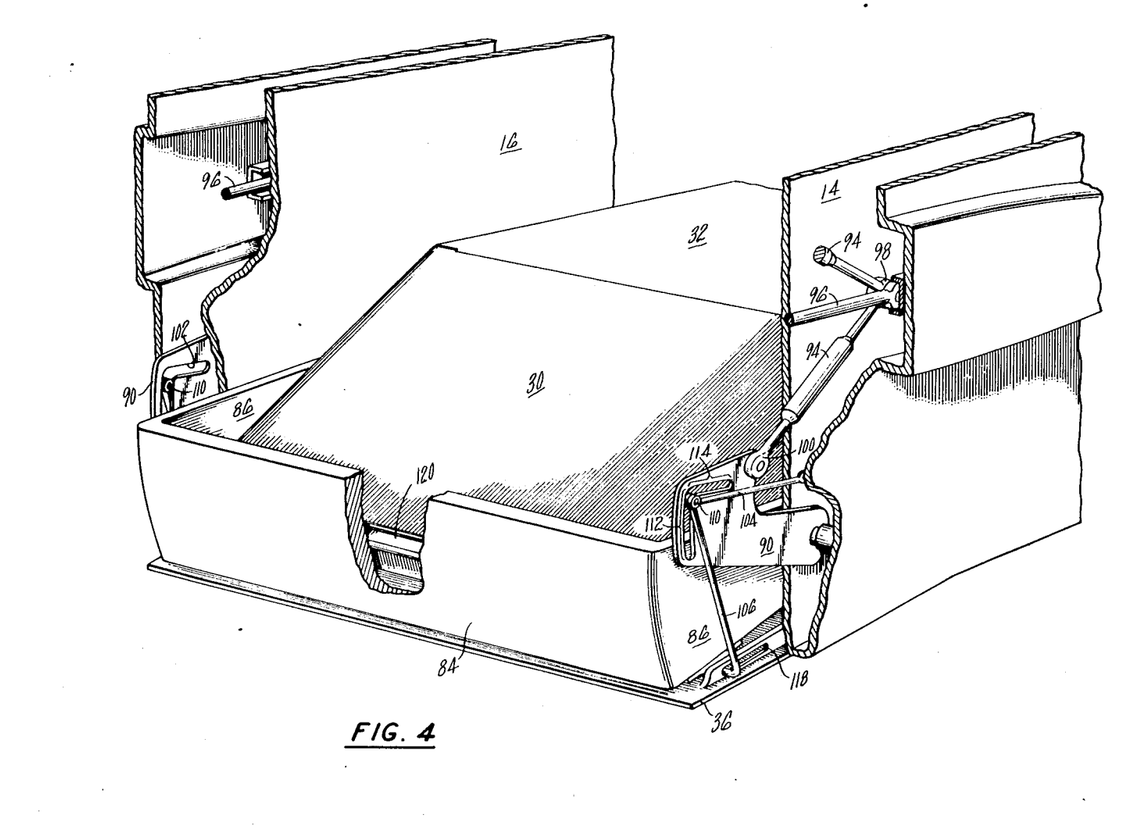
FIG. 4 is a perspective view, looking generally aft and partly broken away, showing the blocker door opening mechanism of the exhaust nozzle.

In accordance with the present invention, a blocker door 84 is operably connected to each of the convergent flaps 30 for opening and closing each of the outlets 66 leading into the chamber 65. As best shown in FIG. 4, each door 84 extends between the sidewalls 14, 16 and is in the shape of a section of a cylinder having an axis concentric with the axis of rotation 38 of its respective convergent flap 30. Each door 84 includes a pair of essentially flat sideplates 86 which are pivotally secured to the sidewalls 14, 16 for rotation about the axis 38. The actuation system for each flap 30 and its associated blocker door 84 comprises an actuation arm 90 within each sidewall 14, 16, the arm 90 being rigidly attached to its respective convergent flap 30 for rotation therewith. An actuator 92 disposed in each sidewall has its pushrod 96 operably connected to the arm 90 by means of a connecting rod 94. One end 98 of the connecting rod 94 is pivotally connected to the pushrod 96, and the other end 100 of the connecting rod 94 is pivotally connected to the actuation arm 90.

In this embodiment, both the upper and lower flap assemblies 26 are operably connected to the same actuators 92 (one actuator in each sidewall) and are actuated simultaneously. The convergent nozzle exit area or throat is defined between the flap rearward edges 44 and the sidewalls 14, 16. FIG. 2 shows the flaps 30 in a position which provides the minimum exit or throat area suitable for forward thrust operation. Maximum exit area is achieved with the pushrod fully extended, and this is shown in phantom in FIG. 2 with elements of the nozzle designated by primed reference numerals. When the pushrod 96 is fully retracted, the rearward edges 44 of the flaps 30 meet at the engine centerline 63 and completely block rearward flow of the engine exhaust gases. This is the full reverse thrust position of the nozzle assembly 10 and is shown in FIG. 3.

With reference to FIGS. 2 and 4, the actuation arms 90 are actually flat plates, each of which has a cam track 102 formed therein. A toggle joint comprising arms 104, 106 interconnect the actuation arm 90 and the blocker door 84. The toggle arm 104 is pivotally connected at its end 107 to the sidewall within which the actuation arm 90 is disposed. The end 108 of the toggle arm 106 is pivotally connected to the side plate 86. The other ends of both toggle arms 104, 106 are pivotally connected to a cam follower 110 which rides in the cam track 102.

The cam track 102 comprises two distinct portions. A first portion 112 has a circular curvature, the center of which is the axis 38 of the flap 30. As the flap 30 moves from its minimum foward thrust exit area to its maximum forwad thrust exit area the cam follower 110 slides within the firs portion 112 of the moving cam track and does not move. A second portion 114 of the cam track is substantially straight and is at almost a 90° angle to the first portion 112. Rotation of the flap 30 to the full reverse thrust position causes the cam follower to slide within the moving cam track portion 114, which results in the cam follower moving away from the engine centerline. This forces the toggle arm end 108, attached to the blocker door side plate 86, to rotate about the axis 38 of the flap 30, thereby rotating the blocker door 84 and opening the exhaust nozzle reverser outlet 66. In this embodiment the cam trunk portion 114 is shaped to rotate the door 84 and flaps 30 at the same angular speed, although this is not critical to the present invention.

Each toggle arm 106 also includes a pin art its end 108. The pin is slideably disposed within a slot 118 in the upstream fairing flap 36. As the blocker door 84 rotates radially outwardly to unblock the reverser outlet 66, the pin moves within the slot 118 and rotates the fairing flap 36 outwardly to make room for the door 84 and flap 30. Simultaneouly with the opening of the blocker doors 84, but by a separate actuation system, the louvers 22, 24 are opened. The engine exhaust gases are thus directed by the flaps 30 out of the nozzle assembly 10 through the outlets 66 and between the louvers.

As best shown in FIG. 2, the forward edge 122 of each flap 30 includes a flexible seal 120 along its length sealingly engaging the convexly curved back surface 124 of the blocker door 84, which surface is a section of a cylinder having an axis 38. Te seal 120 prevents exhaust gases from escaping between the blocker door 84 and the flap 30 during both forward and reverse thrust operation. As the flap 30 rotates through its range of forward thrust positions the seal 106 slides along the surface of the blocker door 84, which is stationary. As the flap 30 moves from its minimum forward thrust exit area position to a full reverse thrust position the seal 120 remains stationary relative to the blocker door 84 which rotates at the same speed as the flap 30. One type of seal which is particularly suitable for use in this application is described in commonly owned U.S. patent application Ser. No. 503,954 filed on June 13, 1983 entitled "Nozzle Flap Edge Seal" by William M. Madden, incorporated herein by reference.

Figure 5:
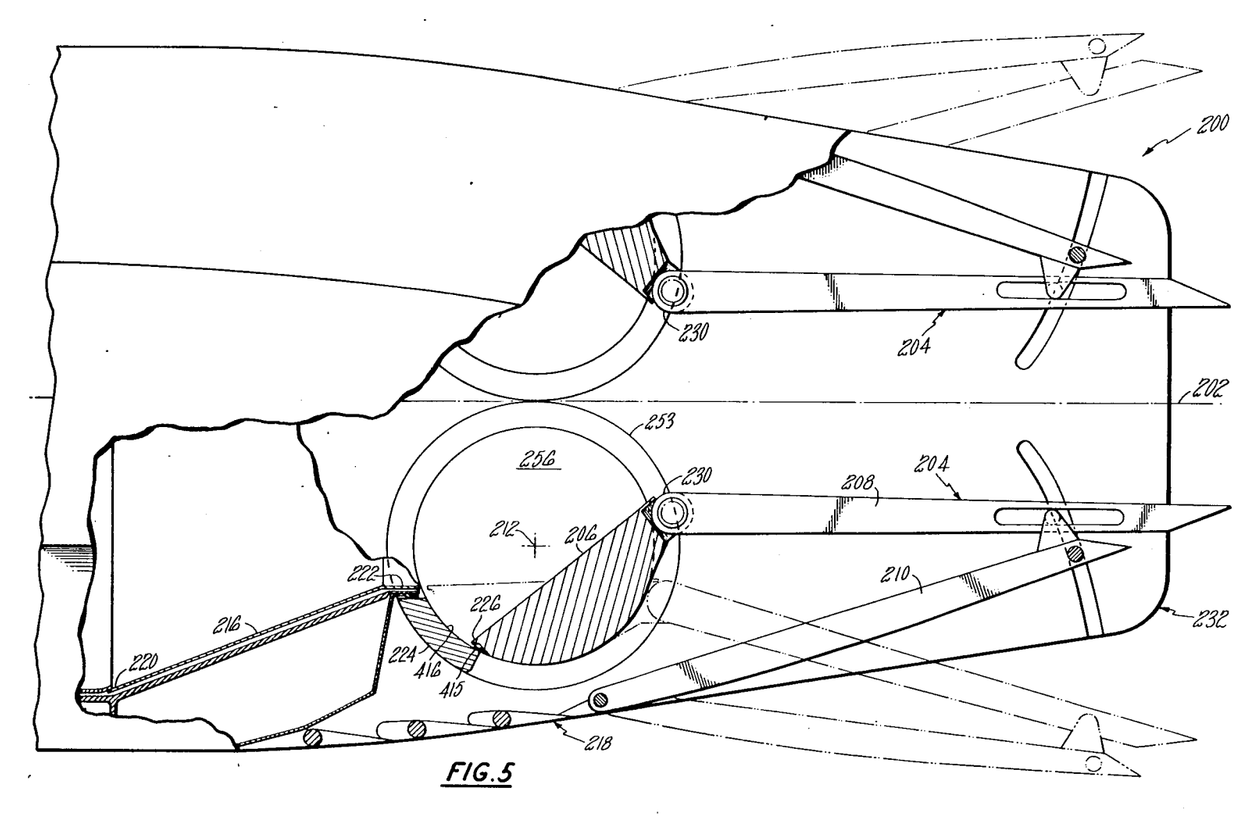
FIG. 5 is a view similar to FIG. 2, but showing another embodiment of the exhaust nozzle of the present invention in a minimum throat area position.
Figure 6:
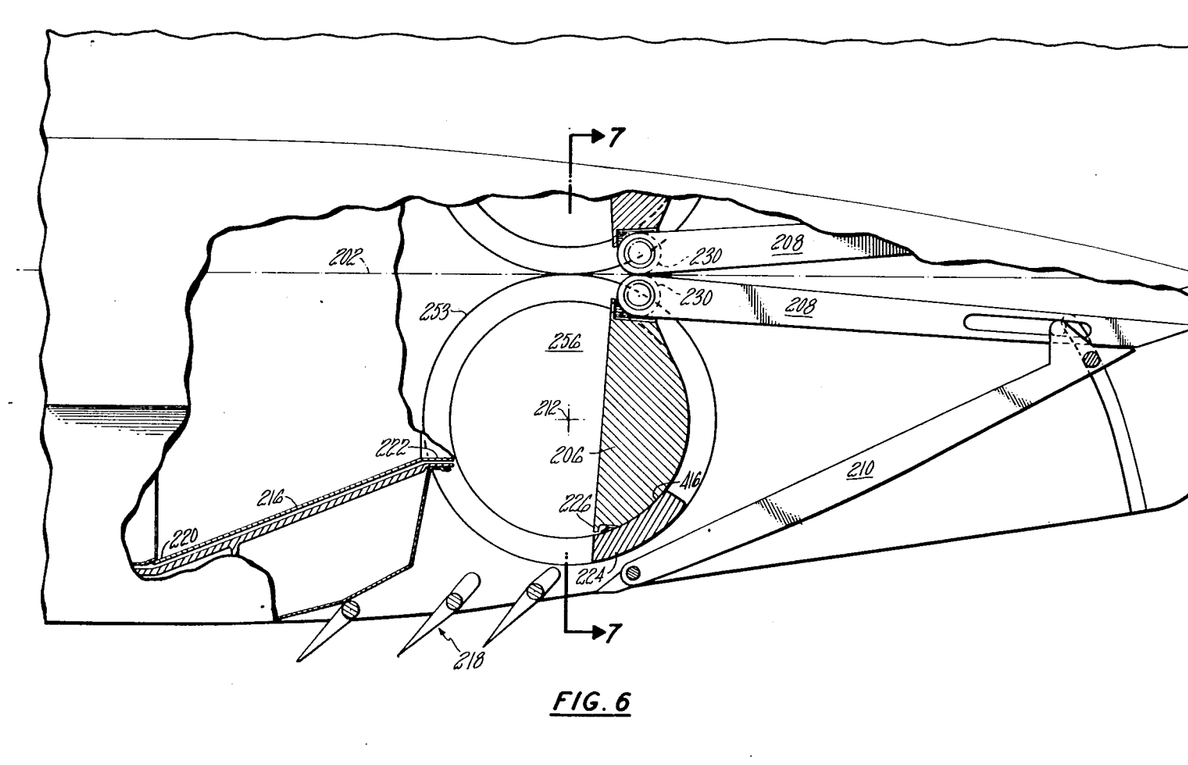
FIG. 6 is a view similar to FIG. 5, but showing the exhaust nozzle in its reverse thrust position.

FIGS. 5-8 show an alternate embodiment of the present invention. Referring first to FIG. 5, the exhaust nozzle assembly of this embodiment is designated generally by the reference numeral 200. The assembly 200 has a centerline 202 which is also the centerline of the engine (not shown) to which the asembly is attached. Like the first embodiment, this embodiment includes upper and lower flap assemblies 204, each comprising a convergent flap 206 having an axis of rotation 212, a divergent flap 208, and an external fairing flap 210. The flaps 206, 208, and 210 are interconnected in a manner similar to their counterparts in the first embodiment, and for that reason no further details need to be provided on that aspect of the nozzle assembly. Other elements of the nozzle assembly 200 which are analogous to elements of the first embodiment are an internal gas path transition duct 216 and two sets of louvers 218 (only the lower set is shown). The transition duct 216 has a circular inlet at its upstream end 220 and a substantially rectangular outlet at its downstream end 222. The invention will be further descbried in connection with only the lower flap assembly, the upper flap assembly being essentially a mirror image of the lower flap assembly.

A blocker door 224 extends between the nozzle assembly sidewalls and is sealingly engaged along its length between the sidewall. In accordance with the present invention, the blocker door 224 remains closed (FIG. 5) and stationary as the flap 206 rotates through a range of forward thrust positions. It opens as the flap 206 moves from its forward thrust minimum exit area position shown in FIG. 5 to its reverse thrust position of FIG. 6. In the reverse thrust position the rearward edge 230 of the lower flap 206 meets the rearward edge 230 of the opposing (i.e. upper) flap 206 at the engine centerline 202. As the blocker door 224 moves to an open position the louvers 218 in the external wall of the nozzle assembly 200 are simultaneously opened by an actuator (not shown) to permit the engine exhaust gases to exit the nozzle assembly and to direct them as desired.

Figure 7:
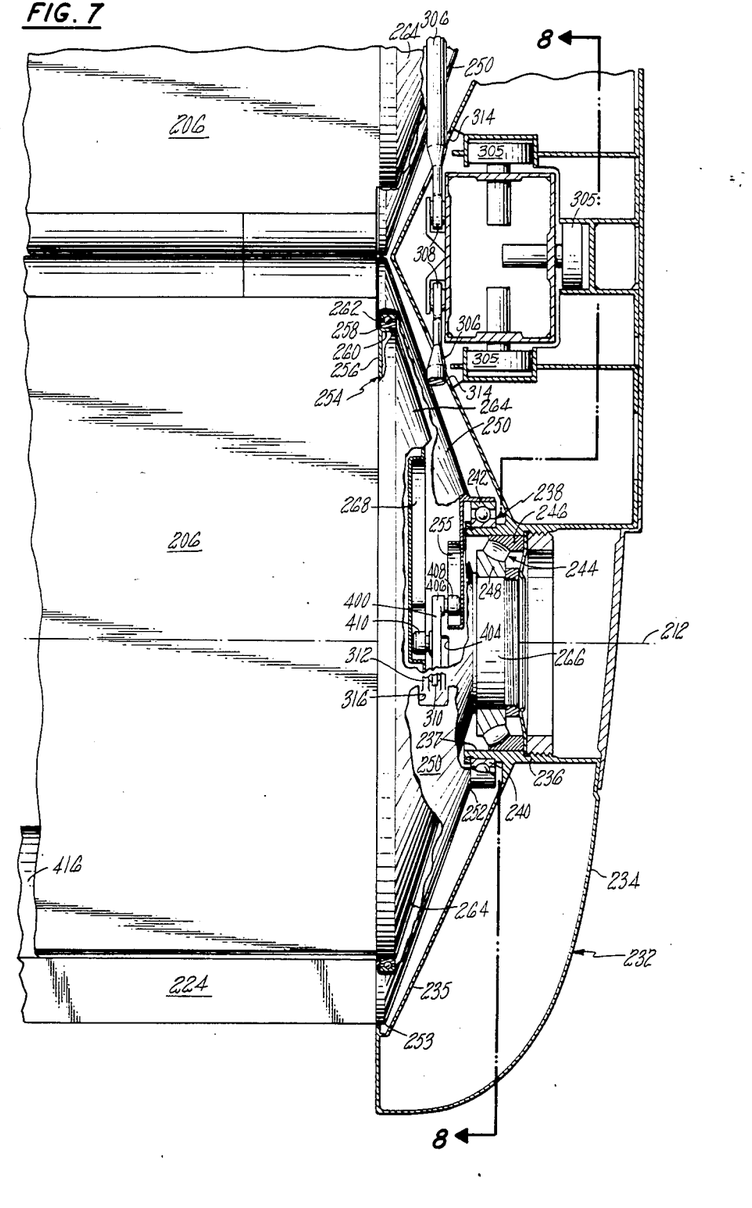
FIG. 7 is a cross sectional view, partly broken away, taken along the line 7—7 of FIG. 6.

FIG. 7 shows one of the nozzle assembly sidewalls 232 and the structure and apparatus ror rotatably supporting the flap 206 and blocker door 224 therefrom. The other sidewall and the supporting structure for the other end of the flap and blocker door are mirror images of the side shown. Onl the lower flap and the lower blocker door and its supporting structure are shown, the upper convergent flap and blocker door being secured in a similar fashion.

With reference to FIG. 7, the sidewall 232 comprises an external stationary wall 234 which has an internal conical stiffening walls 235. Each conical wall 235, is actually a frustum of a cone having its apex on the convergent flap axis of rotation 212. A wall 236, which is substantially cylindrical about the axis of rotation 212, rigidly connects the inner end of the conical wall 235 to the external wall 234. A thrust bearing 238, of the ball type, is supported on the outer periphery of an inwardly extending portion of the cylindrical wall 236. The bearing 238 has a stationary inner race 240, secured to the wall 23; and an outer moveable race 242. One end of blocker door 224 is supported from the bearing 238 by a conical wall 250 secured at its radially innermost end 252 to the bearing outer race 242 and at its outermost end 253 to the one end of the blocker door 224. The wall 250 also carries a curved cam track 255, best shown in FIG. 8. The other end of the blocker door 224 is similarlly supported.

A bearing 244, of the roller type, has its stationary outer race 246 secured to the inside surface of the cylindrical wall 236, and has a moveable inner race 248. One end of the flap 206 is supported by that bearing through support structure generally designated by the reference numeral 254. The structure 254 comprises a generally circular flat plate 256 having an outer circular edge 258 and a center on the axis 212. The surface of the plate 256 forms a part of the exhaust nozzle gas flow path. The end of the flap 206 is fixedly secured to that surface. The circular edge 258 of the plate 256 has a cylindrical outwardly extending lip 260. A guide bearing 262 helps maintain the correct angular orientation of the flap support structure 254 and the blocker door support structure between which the bearing 262 is disposed. The flap support structure 254 also includes a substantially frusto-conical member 264 which extends radially inwardly from the lip 260 to a cylindrical member 266 having an axis 212. The cylindrical member 266 is integral with and extends from the plate 256 to the inner race 248 of the bearing 244. The race 248 is fixedly secured to the member 266. The conical member 264 of the support structure 256 carries a cam track 268 which is in a plane parallel to but spaced from the lane of the cam track 255.

From the foregoing description it is apparent that the convergent flap 206 and the blocker door 224 are supported by separate, nesting cones which are rotatable relative to each other on their respective bearings 244, 238 secured to the sidewall 232.

Figure 8:
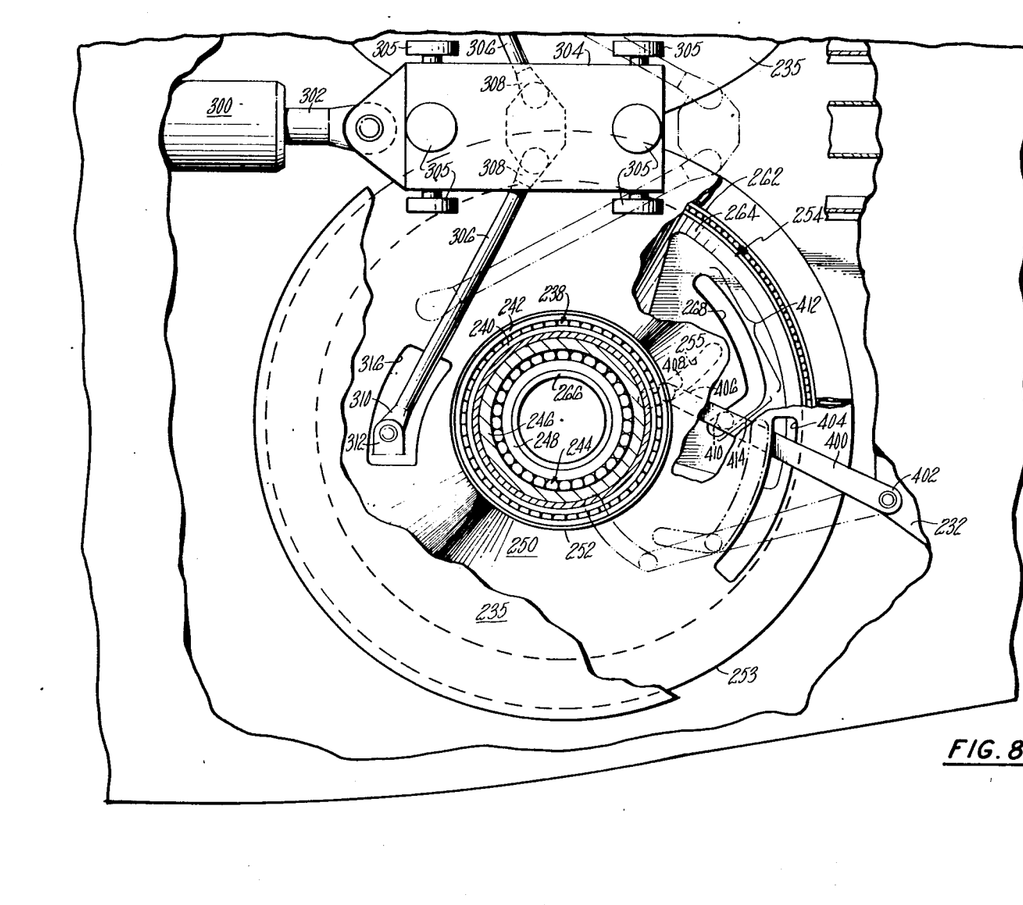
FIG. 8 is a cross sectional view partly broken away, taken along the line 8—8 of FIG. 7.

As best shown in FIG. 8, an actuator 300 includes a pushrod 302. The pushrod 302 is connected to a carriage 304 which moves in a direction parallel to the engine centerline on rollers 305. A connecting rod 306 is pivotally connected at one of its ends 308 to the carriage 304 and at its other end 310 to a clevis 312 which is part of the rotatable support structure 254 of the convergent flap 206. (A similar connecting rod is connected to the upper convergent flap 206.) To reach the clevis 312 the connecting rod 306 passes through a slot 314 in the stationary support cone 235 and through a slot 316 through the rotating support cone 250. Movement of the pushrod 302 causes rotation of the structure 254 and thus the convergent flap 206.

The blocker door 224 and flap 206 are operably interconnected by means of a follower link 400 which is pivotally connected at its end 402 to the stationary sidewall 232. The link 400 extends through a slot 403 in the stationary conical wall 235 and through a slot 404 in the rotatable conica wall 250 of the blocker door support structure. The link extends between the cam track 268 and the cam track 255. The free end 406 of the link 400 include another cam follower 410 disposed part way between its free end 406 and its pivoted end 402. The cam follower 410 rides in the cam track 268.

As best shown in FIG. 8, the cam track 268 includes two distinct portions herein designated by the reference numerals 412 and 414, respectively. The portion 412 has a circular curvature whose center is the axis of rotation 212 of the flap 206. As the actuator 300 rotates the flap 206 from its minimum throat area forward thrust position to its maximum throat area forward thrust position the cam follower 410 stays within the cam track portion 412 and remains stationary, as does the link 400 to which it is secured. As the flap 206 is moved past its minimum throat area forward thrust position to its full reverse thrust position the cam follower 410 moves with and within the cam track portion 414, and the link 400 rotates accordingly. As the link 400 rotates the cam follower 408 moves within the cam track 268, thereby forcing the cam track 268, and thus the blocker door 224, to rotate about the axis 212. The positions of the cam tracks 255, 268 and link 400 when the flap 206 is in its full reverse thrust position is shown in FIG. 8 in full. The position of the cam tracks 255, 268 and link 400 when the flap 206 is in its minimum area forward thrust position is also shown in FIG. 8, but in phantom. As is apparent from FIGS. 5 and 6, in this embodiment, the cam tracks and link 400 are constructed and arranged such that, as the flap 206 is moved from its minimum exit area forward thrust position to its full reverse thrust position, the blocker door 224 moves through a much larger angular rotation than does the flap, thereby forming a considerably larger exhaust gas outlet than would be possible if the angular movement of the flap and blocker door were equal. As was the case in the first embodiment described herein, a seal 415 extends the length of and is attached to the forward edge 226 of the flap 206. The seal 415 engages the back cylindrical surface 416 of the blocker door 224 throughout all movement of the flap 206 and the blocker door 224.

Although the invention has been shown and described with respect to a preferred embodiment thereof, it should be understood by those skilled in the art that other various changes and omissions in the form and detail thereof may be made there in without departing from the spirit and the scope of the invention.

I claim:

1. An exhaust nozzle assembly for an aircraft engine, said engine having a centerline and comprising:
    exhaust duct means including means defining reverse flow outlet means, said exhaust duct means having spaced apart stationary sidewall means; and
    an upper and lower flap assembly each including a nozzle flap having a forward edge and rearward edge, said nozzle flaps each extending between and pivotally secured to said sidewall means, said flaps being spaced apart and rotatable about respective parallel axes and forming between them a gas flow path having an exit area defined by said flap rearward edges and said sidewall means, said nozzle flaps being rotatable through a range of forward thrust positions and a range of reverse thrust positions including a full reverse thrust position wherein said rearward edges meet at said engine centerline and said exit area is reduced to zero, each flap assembly including:
        (A) blocker door means extending between and pivotally connected to said sidewall means and rotatable about said axis of said nozzle flap of its respective flap assembly from a closed position which blocks said outlet means to an open position which unblocks said outlet means, said respective nozzle flap including seal means along its forward edge in sealing contact with said blocker door means in all positions of said respective nozzle flap to prevent exhaust gases from escaping between said blocker door means and said respective nozzle flap; and
        (B) actuation means connected to said blocker door means and respective nozzle flap and adapted to
            (1) rotate said nozzle flap through its range of forward thrust positions and its range of reverse thrust positions;
            (2) maintain said blocker door means stationary and in its closed position as said respective nozzle flap moves through its range of forward thrust positions; and
            (3) rotate said blocker door means from its closed position to its open position about said respective nozzle flap axis as said nozzle flap is rotated through its range of reverse thrust positions, said respective nozzle flap adapted to direct the engine exhaust through said outlet means when said blocker door means is in its open position wherein said actuation means includes a cam track connected to said respective flap means for rotation therewith, said actuation means also including a cam follower and linkage means connected to said cam follower, said linkage means having a first end pivotally connected to one of said sidewall means and a second end operably connected to said blocker door means, said cam follower being disposed within said cam track, said cam track being adapted to maintain said linkage means substantially stationary as said flap means rotates through its range of forward thrust positions and adapted to move said second end of said linkage means to rotate said blocker door means to its open position as said flap means rotates through its range of reverse thrust positions.

2. The exhaust nozzle assembly according to claim 1 wherein said linkage means comprises a first toggle arm having a near end and a second toggle arm having a near end, said near ends of said first and second toggle arms being pivotally connected to said cam follower, said first toggle arm also having a distal end which is said linkage means second end and pivotally connected to said blocker door means.

3. The exhaust nozzle assembly according to claim 1 wherein said blocker door means includes a concave back surface having the shape of a portion of a cylinder whose axis of rotation is the axis of rotation of said blocker door means, said forward edge of said respective nozzle flap sealingly engaging said back surface as said flap rotates.

4. An exhaust nozzle assembly for an aircraft engine, said engine having a centerline and comprising:
    exhaust duct means including means defining reverse flow outlet means, said exhaust duct means having spaced apart stationary sidewall means; and
    an upper and lower flap assembly each including a nozzle flap having a forward edge and rearward edge, said nozzle flaps each extending between and pivotally secured to said sidewall means, said flaps being spaced apart and rotatable about respective parallel axes cnd forming between them a gas flow path having an exit area defined by said flap rearward edges and said sidewall means, said nozzle flaps being rotatable through a range of forward thrust positions and a range of reverse thrust positions including a full reverse thrust position wherein said rearward edges meet at said engine centerline and said exit area is reduced to zero, each flap assembly including:
        (A) blocker door means extending between and pivotally connected to said sidewall means and rotatable about said axis of said nozzle flap of its respective flap assembly from a closed position which blocks said outlet neans to an open position which unblocks said outlet means, said blocker door means including a concave back surface having the shape of a portion of a cylinder whose axis of rotation is the axis of rotation of said blocker door means, said respective nozzle flap including seal means along its forward edge sealingly engaging said back surface in all positions of said respective nozzle flap to prevent exhaust gases from escaping between said blocker door means and said respective nozzle flap; and (B) actuation means connected to said blocker door means and respective nozzle flap and adapted to (1) rotate said nozzle flap through its range of forward thrust positions and its range of reverse thrust positions;
(2) maintain said blocker door means stationary and in its closed position as said respective nozzle flap moves through its range of forward thrust positions; and
(3) rotate said blocker door means from its closed position to its open position about said respective nozzle flap axis as said nozzle flap is rotated through its range of reverse thrust positions, said respective nozzle flap adapted to direct the engine exhaust gases through said outlet means when said blocker door means is in its open position.

* * * * *